E. J. SHAUT.
PASTRY BAKING MACHINE.
APPLICATION FILED JUNE 27, 1919.

1,333,781.

Patented Mar. 16, 1920.
4 SHEETS—SHEET 1.

Inventor
Edwin J. Shaut
By H. B. Willson & Co.
Attorneys

E. J. SHAUT.
PASTRY BAKING MACHINE.
APPLICATION FILED JUNE 27, 1919

1,333,781.

Patented Mar. 16, 1920.
4 SHEETS—SHEET 4.

Inventor
Edwin J. Shaut
By H. B. Willson & Co.
Attorneys

UNITED STATES PATENT OFFICE.

EDWIN JOSEPH SHAUT, OF ROCHESTER, NEW YORK, ASSIGNOR, BY DIRECT AND MESNE ASSIGNMENTS, TO ROCHESTER PATENTS CORPORATION, OF ROCHESTER, NEW YORK, A CORPORATION OF NEW YORK.

PASTRY-BAKING MACHINE.

1,333,781.      Specification of Letters Patent.      Patented Mar. 16, 1920.

Application filed June 27, 1919. Serial No. 307,071.

*To all whom it may concern:*

Be it known that I, EDWIN J. SHAUT, a citizen of the United States, residing at Rochester, in the county of Monroe and State of New York, have invented certain new and useful Improvements in Pastry-Baking Machines; and I do declare the following to be a full, clear, and exact description of the invention, such as will enable others skilled in the art to which it appertains to make and use the same.

My invention has for its principal object to provide a comparatively simple and inexpensive, yet a highly efficient, reliable, and in every way desirable machine for continuously baking pastry, and by using proper molds, it may be employed for the manufacture of pastry pans or dishes to contain ice-cream, although it will be understood that it could be used for numerous other purposes.

In carrying out the above end, I provide an endless chain carrying baking molds, employ a tank for depositing batter in the molds, and use an oven through which the chain passes for baking the batter, and further objects are to provide hinged covers for the molds and a novel cam track for opening and closing said covers at the proper times; to provide efficient means for controlling the discharge of batter into the molds; to devise novel means for greasing both the molds and their covers prior to filling with batter; and to employ efficient means for at all times removing slack from the mold carrying chain.

In carrying out the above objects, I make use of numerous novel features of construction and arrangement which are hereinafter described and claimed, and shown in the accompanying drawings.

Fig. 5 is a perspective view of the portion of the cam track shown at the right of Fig. 1 and in end elevation in Fig. 3, and Fig. 6 is a similar view of the trackage at the other end of the machine.

Figure 1:
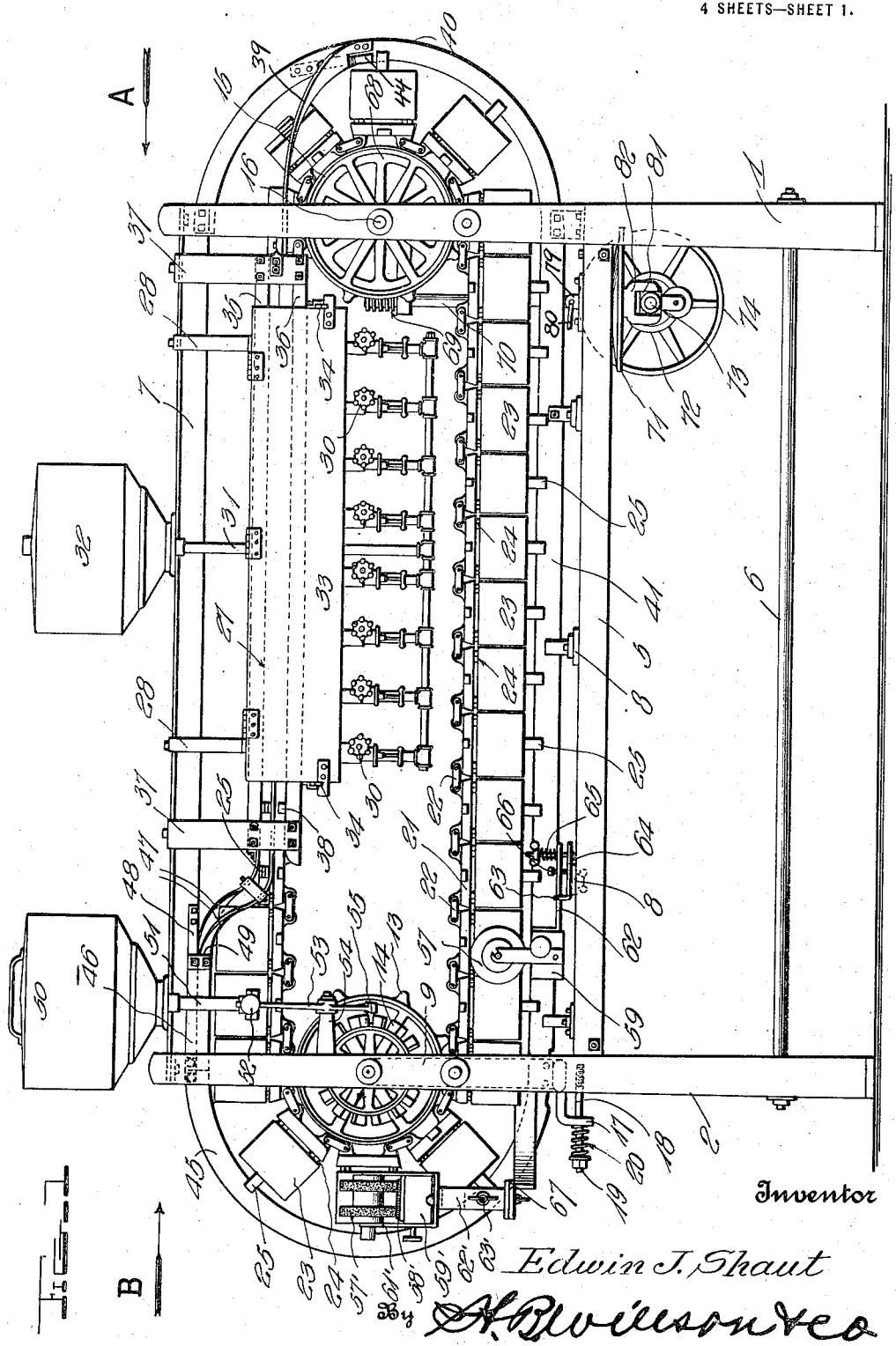
Figure 1 is a side elevation of a machine constructed in accordance with my invention.
Figure 2:
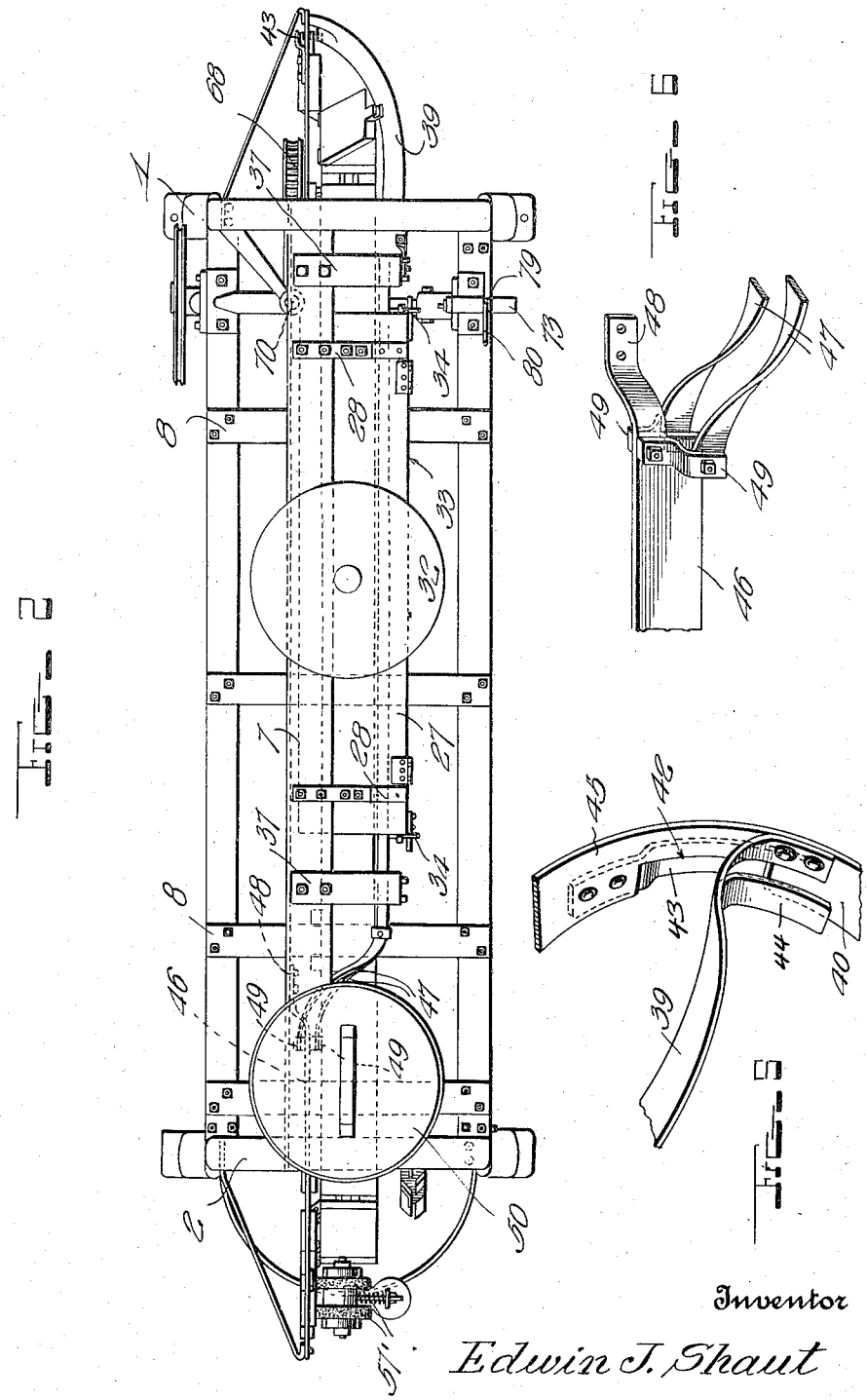
Fig. 2 is a top plan view.
Figure 3:
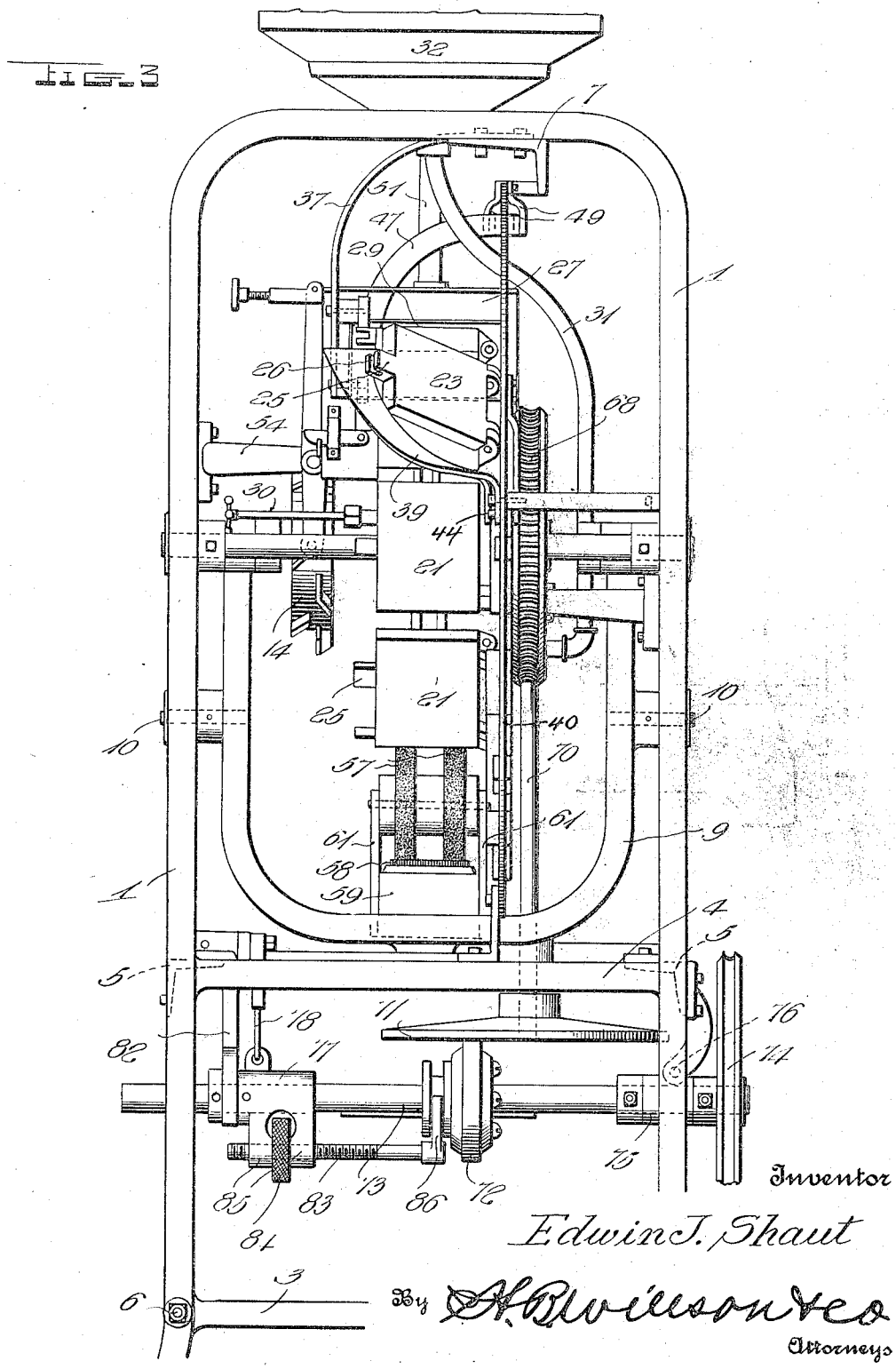
Fig. 3 is an end elevation of the machine looking in the direction of the arrow A of Fig. 1.
Figure 4:
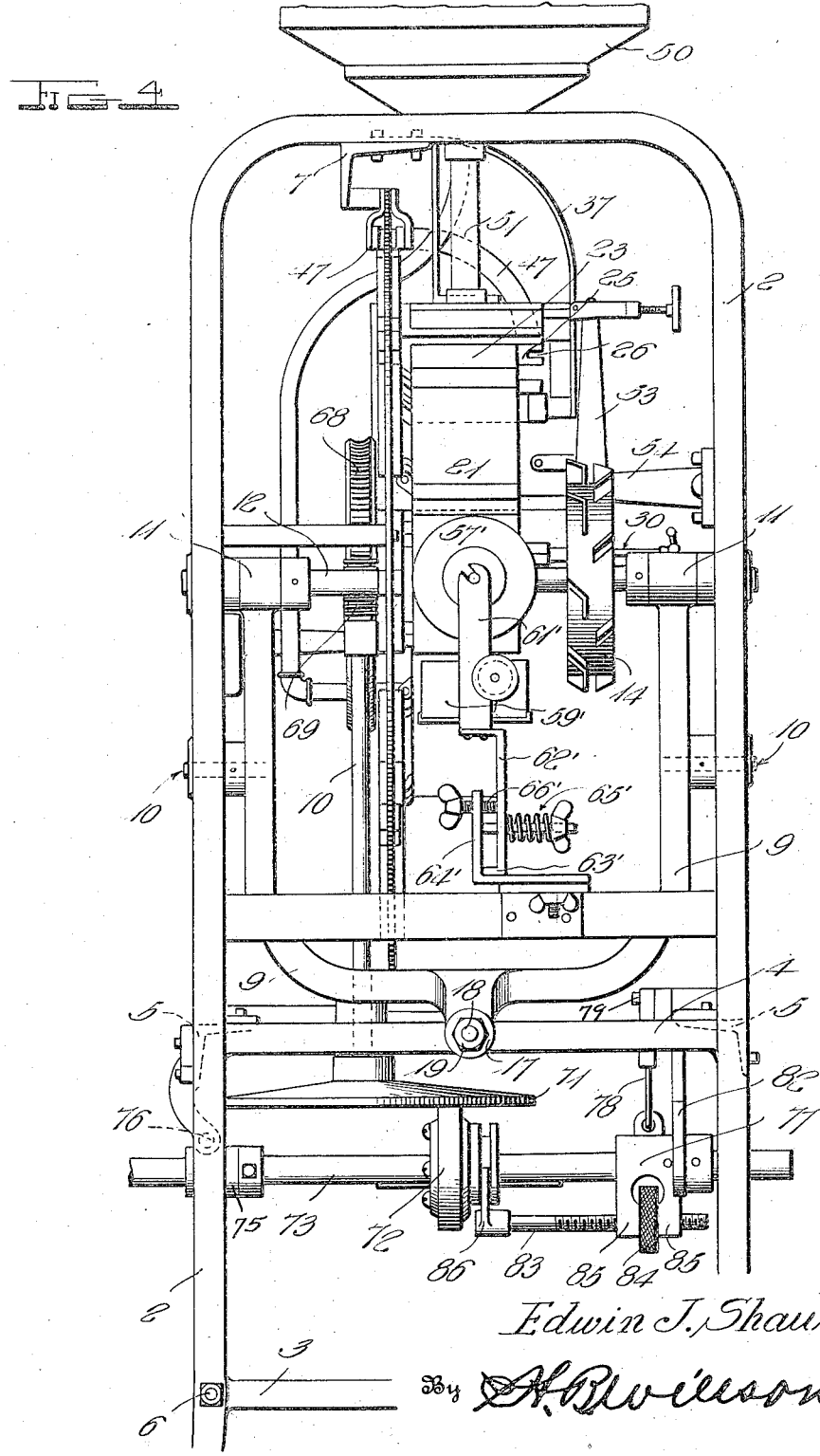
Fig. 4 is an end elevation looking in the direction indicated by the arrow B of Fig. 1.

The frame structure of the machine consists briefly of two vertical end frames 1 and 2 respectively which are preferably of arch shape as seen in Figs. 3 and 4, the vertical side bars of each frame being by preference tied together by a lower transverse bar 3 and a similar bar 4 located at approximately the vertical center of the frame, though slightly below said center. The side bars of the two frames are connected by longitudinal bars 5, the lower ends of said frames may be similarly connected by one or more tie rods 6, and the crowns of the two frames are secured to the ends of a substantially central longitudinal bar 7, the three bars 5 and 7 being by preference of angle iron construction. The bars 5 are connected at intervals by transverse bars 8 which serve to support part of the trackage to be hereinafter described.

Located between the side bars of the end frame 2, above the cross-bar 4 thereof, is a U-frame 9, the vertical arms of said U-frame being fulcrumed between their ends to said side bars as seen at 10, while the upper ends of said vertical bars carry bearings 11 in which a transverse shaft 12 is rotatably mounted, said shaft carrying a sprocket wheel 13 and a cam wheel 14. The chain which carries the molds is trained around the sprocket 13 and over another sprocket 15 secured on a transverse shaft 16 which is rotatably supported by the side bars of the frame 1, in horizontal alinement with the shaft 12, and in order to prevent slack in said chain, I provide means exerting a rocking action on the frame 9 to at all times pull the shaft 12 away from shaft 16. For obtaining this result, I preferably provide the lower end of frame 9 with a lug 17 spaced upwardly from the cross-bar 4 of the frame 2 and slidable on a horizontal stud 18 which projects longitudinally of the machine from said cross-bar; the outer end of stud 18 is provided with a nut 19 or other abutment, and a coil spring 20 is interposed between said abutment and the lug 17. This construction causes the spring to exert a constant inward stress on the lower end of frame 9 and consequently an outward stress on the upper end thereof to at all times tighten the mold carrying chain.

The chain above referred to, is preferably formed in part by the molds 21 although these molds could well be attached to a separate chain. In the construction shown, however, they are linked together at 22 and the teeth of the sprocket wheels 13 and 15 coöperate with the links. The links 22 have pivotal movement only in a direction to allow passage of the chain around the sprockets, and since said chain is always kept tight by the parts 9 and 20, the molds will not tilt laterally. The covers 23 of the molds are hinged at 24 at one edge of the chain and the edges of said covers opposite the hinges are provided with track engaging shoes preferably consisting of lugs 25 having grooves 26 in their outer ends extending longitudinally of the chain. By the provision of a novel cam track coöperating with the lugs 25, the covers 23 are held open while the entire mold is being greased and filled with batter and are then closed and held in this position while the molds pass through the baking oven. This oven may well be in the form of an elongated casing 27 supported by suitable hangers 28 from the longitudinal bar 7 and having openings 29 in its ends through which the molds enter and leave. Any suitable burners 30 may be used for the oven 27 and may be connected by piping 31 with a fuel tank 32. The oven is preferably provided with a hinged door 33 held normally closed by suitable latches 34.

Upper and lower longitudinal tracks 35 and 36 respectively pass longitudinally through the oven 27 and are supported by hangers 37 from the bar 7, and the lugs 25 travel along the lower side of the upper track 35, whereby the covers 23 are held in closed position during such baking operation; and projecting lugs 38 on the bottom sections of the molds, slide along the lower track 36 during the baking operation. By engaging both the lugs 25 and 38 with the tracks 35 and 36, it is insured that any torsional movement of the chain shall not permit leakage of batter from the molds.

When the lugs 25 leave the track 35, they slide upon a cam track 39 which curves downwardly and laterally to one upturned end 40 of a longitudinal track 41 which is supported by the cross-bars 8, and in order to insure that the edge of this track 41 may be received in the grooves 26 between said lugs 25, I preferably provide the guide means detailed in Fig. 5. A notch 42 is formed in the curved end 40 of track 41 at its juncture with track 39, and by means of vertical guide fingers 43 and 44 located on opposite sides of said notch, the lugs are guided into proper engagement with the track 41. The other end of the track 41 curves upwardly at 45, concentric with the shaft 12, continues longitudinally at the upper end of the frame as seen at 46, and by downwardly and laterally curved branch tracks 47, is connected to the tracks 35 and 36. The free end of the part 46 of the track is preferably reduced in width by cutting away its lower edge and is secured at 48 to the bar 7, while downwardly diverging hangers 49 connect said track part with the upper ends of the branch tracks 47. This arrangement is detailed in Fig. 6 and by such arrangement, it is insured that as the lugs 25 leave the end 46 of the track 41, they shall be guided downwardly and laterally into engagement with the track 35, thereby closing the molds.

Located over the track end 46 is a batter tank 50 from which a discharge tube 51 depends to a point above the travel of the then open molds. A suitable valve 52 is carried by the lower end of tube 51 and is operated by a vertical lever 53 which may well be fulcrumed to a bracket 54 carried by frame 2, said lever being adapted to swing transversely of the machine and having a longitudinal pin 55 on its lower end coacting with the angularly arranged peripheral cams 56 of the cam wheel 14. By this arrangement, as the wheel 14 rotates, the lever 53 will be oscillated to open the valve 52 each time a mold 21 is positioned beneath the tube 51, and by providing the pin 55 coacting with the cams of the cam wheel, shifting of said wheel by the frame 9 and its spring 20, will merely slide the cams with respect to the pin but will not move them out of operative relation.

A suitable number of brushes or the like 57 are provided for greasing the bottom sections of the molds as they travel beneath the oven 27 on their return movement, and said brushes may well be of rotary form supplied with oil by a wick 58 dipping into an oil tank 59. The wick may be adjusted by any suitable means 60, such as an ordinary lamp wick adjuster, to compensate for wear, and in order that any wear of the brushes 57 may not permit the molds to pass unoiled, I provide means for adjusting the oil tank 59 vertically and since said brushes are supported on posts 61 rising from the tank, they will be similarly adjusted. In the present showing, I have mounted the tank 59 on an arm 62 which is fulcrumed between its ends at 63 on a base 64 secured to one of the transverse bars 8, a spring 65 being provided to rock said arm in a manner to raise the tank and brushes, while a set screw 66 is employed to limit such rocking so as to prevent mutilation of the brushes.

A very similar device is provided for greasing the covers 23 of the molds while they are held in open position, said device consisting of greasing brushes 57' rotatable on posts 61' rising from an oil tank 59' having an adjustable wick 58'. The tank 59' is mounted on a vertical arm 62' which is fulcrumed at 63' on a bracket 64'. A spring 65' and set screws 66' are provided to control the movement of the arm 62' and consequently the brushes 57' may be adjusted for proper contact with the covers of the molds. The bracket 64' is secured to a bracket 67 which extends from the end frame 2.

Any preferred means could be provided for driving the chain carrying the molds, but I prefer to secure a worm gear 68 on the shaft 16 and to provide a worm 69 on a vertical shaft 70 for rotating said worm. The lower end of shaft 70 is shown provided with a large friction disk 71 driven by a friction wheel 72 splined on a transverse drive shaft 73 which may be driven by any preferred means such as a belt and a pulley 74. One end of shaft 73 is rotatable in a bearing 75 which is hingedly supported at 76, while the bearing 77 for the other end of said shaft is vertically movable. It will thus be seen that by lowering the bearing 77, the wheel 72 may be moved out of contact with disk 71 and consequently the machine will not be driven. However, when said bearing is raised and the wheel and disk are brought into contact, the shaft 70 is rotated to drive the chain.

Any adequate means could be employed for raising and lowering the bearing 77 but I preferably extend a link 78 upwardly therefrom and suitably connect it to a short rock shaft 79 having a handle 80 and any suitable holding means, and in order to prevent said bearing from rotating, regardless of its vertical position it may well be provided with a squared portion 81 slidable in a fixed fork 82. Operation of handle 80, turns shaft 79 and moves the link 78 to raise or lower shaft 73 as required, for either stopping or starting the machine.

To adjust the wheel 72 along the disk 71 and thereby control the speed at which the machine is driven, I preferably provide a threaded rod 83 and a nut 84 on said rod, the nut being swiveled between depending arms 85 on the bearing 77, while the rod is provided with a fork 86 engaging the grooved hub of the wheel 72. By rotating the nut 84, the rod 83 is longitudinally shifted to adjust the wheel 22 along the disk 71.

In operation, the burners 30 are lighted to heat the oven 27, the tank 50 is filled with batter, the oil tanks 59 and 59' are supplied with oil and the oiling brushes 57 and 57' are properly adjusted for oiling both the lower and upper sections of the molds. When the oven has reached the required temperature, the shaft 73 is shifted upwardly around the hinge 76 to bring the wheel 72 in contact with the disk 71, thereby rotating the vertical shaft 70 which in turn drives the shaft 16 by means of the worm 69 and worm gear 68. The sprocket 15 of the shaft 16 now drives the mold carrying chain and this chain in turn drives shaft 12 and its cam wheel 14. As each mold is positioned under the tube 51, the cams 56 and the lever 53 open the valve 52 and a quantity of batter is thus discharged into such mold, the valve being then closed until the next mold is under said valve. The branch tracks 47 now come into play to close the covers 23 of the molds so that the batter is pressed out into a thin layer corresponding to the internal shape of mold. The molds are held closed by the coaction of the track 35 and 36 with the lugs 25 and 38 and in this closed position, they are moved slowly through the oven 27, so that their contents are baked to the required extent. If the machine is not baking sufficiently, the chain may be driven slowly by adjusting the wheel 72 toward the periphery of the disk 71, and if there is a tendency to burn the pastry, said wheel may be shifted toward the center of the disk to more rapidly move the molds through the oven. By making these adjustments and properly regulating the burners 30, the pastry may be baked to the most advantageous degree. As the molds leave the oven, the track 39 comes into play to raise the covers 23 and to guide the lugs 25 onto the upturned end 40 of the track 41. The covers are thus held in an open position for return movement and as soon as the molds are inverted by traveling around the sprocket 15, the completely baked pastry will fall therefrom into a suitable receptacle (not shown). On their return movement the lower sections of the mold are greased by the brushes 57 and their covers are similarly greased by the brushes 57', and when said molds arrive below the tube 51, they are again filled with batter.

Since excellent results may be obtained from the details disclosed, they may well be followed, but I wish it understood that within the scope of the invention as claimed, numerous changes may well be made.

I claim:

1. In a pastry baking machine, an endless chain having molds provided with hinged covers, guiding and driving means for said chain, means for automatically discharging batter in said molds, an oven spaced from said batter discharging means, one reach of said chain passing through said oven, means for closing the covers of said molds between the filling thereof and their passage through said oven, means for opening said covers after passage of the molds through the oven, whereby to discharge the baked pastry, and greasing devices acting at right angles to each other while the molds are open for greasing both the body portions of the molds and their covers, while the molds are approaching said batter discharging means.

2. In a pastry baking machine, an oven, an endless chain having molds provided with hinged covers, said chain having an upper reach passing through said oven, guiding and driving means for said chain, means for automatically discharging batter into said molds, cam trackage for closing the covers of said molds as the latter travel from said batter discharging means to said oven, additional cam trackage for again opening said covers when the molds leave the oven, other trackage connecting said first and second trackage for holding said covers in open position through the remainder of their travel and greasing devices adjacent said trackage and acting at right angles to each other for greasing said molds and their covers while the latter are held in open position.

3. In a pastry baking machine, an oven, an endless chain, molds mounted at their centers on said chain and provided with hinged covers, said chain having a reach passing through said oven, guiding and driving means for said chain, means for closing the covers of said molds after the batter has been discharged into them, and parallel tracks for contact with the molds and their covers to hold them tightly closed during their passage through the oven.

4. In a pastry baking machine, an oven, an endless chain, molds mounted centrally on said chain and provided with hinged covers, said chain having a reach passing through said oven, guiding and driving means for said chain, means for closing the covers of said molds after the batter has been discharged into them, projecting lugs on the molds and their covers, and parallel tracks extending through said oven for engagement with said lugs to hold the molds in tightly closed position during their passage through said oven.

5. In a pastry baking machine, an oven, an endless chain having molds provided with hinged covers, said covers having projecting lugs, said chain having an upper reach passing through said oven, driving and guiding means for said chain, parallel trackage receiving said lugs therebetween to close the covers of the molds after the latter have been filled with batter and to hold said covers in closed position during their travel through the oven, a cam track at the end of said parallel trackage for engagement with said lugs to open said covers after passage of the molds through the oven, a single track leading from the end of said cam track to the inlet end of said parallel trackage, said lugs having guides to travel on said single track, and means for directing said guides onto said single track.

6. In a pastry baking machine, an oven, an endless chain having molds provided with hinged covers, said covers having projecting lugs, said chain having an upper reach passing through said oven, driving and guiding means for said chain, parallel trackage receiving said lugs therebetween to close the covers of the molds after the latter have been filled with batter and to hold said covers in closed position during their travel through the oven, a cam track at the end of said parallel trackage for engagement with said lugs to open said covers after passage of the molds through the oven, a single track leading from the end of said cam track to the inlet end of said parallel trackage, said lugs having guides to travel on said single track, said single track having a notch at its juncture with said cam track, and depending fingers on opposite sides of said notch carried respectively by said cam track and said single track for directing the guides of said lugs onto the latter.

7. In a pastry baking machine, an oven, an endless chain provided with molds and having a reach traveling through said oven, a batter tank above said reach having an outlet disposed over the travel of said molds and provided with a valve, a lever connected with said valve for opening the same, guiding and driving sprockets for said chain, a shaft rotatable bodily with one of said sprockets, a projecting pin on said lever, and a cam wheel on said shaft having peripheral cams engaging said pin to operate said lever; together with means for adjusting said shaft laterally to tighten said chain, said cams being slidable along said pin during such adjustment.

8. In a pastry baking machine, a pair of spaced vertical end frames and longitudinal bars connecting them, a transverse drive shaft mounted on one end frame and carrying a sprocket, a U-frame fulcrumed between its upper and lower ends on the other end frame, a transverse shaft carried by the upper end of said U-frame and having an additional sprocket, an endless chain trained around said sprockets and having molds, an oven through which said molds pass, and means associated with the lower end of said U-frame for rocking the latter around its fulcrum to at all times tighten said chain.

9. In a pastry baking machine, a pair of spaced vertical end frames and longitudinal bars connecting them, a transverse drive shaft mounted on one end frame and carrying a sprocket, a U-frame fulcrumed between its upper and lower ends on the other end frame, a transverse shaft carried by the upper end of said U-frame and having an additional sprocket, an endless chain trained around said sprockets and having molds, an oven through which said molds pass, and spring means operatively associated with the lower end of said U-frame for rocking the latter around its fulcrum to at all times tighten said chain.

10. In a pastry baking machine, an oven, an endless chain having a reach passing through said oven, said chain being provided with molds, guiding and driving means for said chain, a brush for greasing said molds, an oil tank for supplying oil to said brush, said brush and tank being bodily movable, an arm extending rigidly from said tank and fulcrumed for movement toward the molds to adjust the brush to said molds, and means for holding said arm in adjusted position.

11. In a pastry baking machine, an oven, an endless chain having a reach passing through said oven, said chain being provided with molds, guiding and driving means for said chain, a brush for greasing said molds, an oil tank for supplying oil to said brush, said brush and tank being bodily movable, an arm extending rigidly from said tank and fulcrumed for movement toward the molds to adjust the brush to said molds, spring means exerting a constant tendency to rock said arm for properly positioning said brush, and a set screw for limiting such rocking movement.

12. In a pastry baking machine, a pair of spaced vertical end frames and longitudinal bars connecting them, a transverse drive shaft mounted on one end frame and carrying a sprocket, a U-frame pivoted on the other end frame, a transverse shaft carried by said U-frame and having an additional sprocket, an endless chain trained around said sprockets and having molds, an oven through which said molds pass, and means associated with said U-frame for rocking the latter around its pivotal axis for tightening said chain.

13. In a pastry baking machine, a pair of spaced vertical end frames and longitudinal bars connecting them, a transverse drive shaft mounted on one end frame and carrying a sprocket, a U-frame pivoted on the other end frame, a transverse shaft carried by said U-frame and having an additional sprocket, an endless chain trained around said sprockets and having molds, an oven through which said molds pass, and spring means operatively associated with said U-frame for yieldably rocking the latter around its fulcrum to at all times tighten said chain.

14. In a pastry baking machine, an oven, an endless chain having a reach passing through said oven, said chain being provided with molds, guiding and driving means for said chain, a brush for greasing said molds, an oil tank for supplying oil to said brush, said brush and tank being bodily movable, and means for adjusting said tank and brush to properly present the latter to said molds.

In testimony whereof I have hereunto set my hand.

EDWIN JOSEPH SHAUT.